(12) United States Patent
Cloud et al.

(10) Patent No.: US 11,874,506 B2
(45) Date of Patent: Jan. 16, 2024

(54) SYSTEM AND METHOD FOR OPTICAL COMMUNICATIONS USING CWDM FERRULE MATED TO A NON-CWDM FERRULE

(71) Applicant: US Conec, Ltd, Hickory, NC (US)

(72) Inventors: Mitchell Cloud, Hickory, NC (US); DJ Hastings, Crouse, NC (US); Darrell R. Childers, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

(21) Appl. No.: 17/635,253

(22) PCT Filed: Aug. 27, 2020

(86) PCT No.: PCT/US2020/048213
§ 371 (c)(1),
(2) Date: Feb. 14, 2022

(87) PCT Pub. No.: WO2021/041686
PCT Pub. Date: Mar. 4, 2021

(65) Prior Publication Data
US 2022/0291459 A1    Sep. 15, 2022

Related U.S. Application Data

(60) Provisional application No. 62/892,413, filed on Aug. 27, 2019, provisional application No. 62/892,416, filed on Aug. 27, 2019.

(51) Int. Cl.
*G02B 6/293* (2006.01)
*G02B 6/38* (2006.01)
(Continued)

(52) U.S. Cl.
CPC ......... *G02B 6/3829* (2013.01); *G02B 6/2938* (2013.01); *G02B 6/29361* (2013.01);
(Continued)

(58) Field of Classification Search
CPC .... G02B 6/29361; G02B 6/2938; G02B 6/34; G02B 6/3807; G02B 6/3829;
(Continued)

(56) References Cited

U.S. PATENT DOCUMENTS 5,546,212 A    8/1996  Kunikane et al.
9,229,167 B2 *  1/2016  Chang ................. G02B 6/2938
(Continued)

FOREIGN PATENT DOCUMENTS

JP    2005091996 A    4/2005
JP    2019090973 A    6/2019

OTHER PUBLICATIONS

International Search Report dated Dec. 9, 2020; 3 Pages.
Written Opinion of ISR; dated Dec. 9, 2020; 5 pages.

*Primary Examiner* — Ryan A Lepisto
(74) *Attorney, Agent, or Firm* — Michael L Leetzow PLLC; Shubhrangshu Sengupta

(57) ABSTRACT

An assembly of two fiber optic ferrules allows for the mating of a CWDM fiber optic ferrule with a non-CWDM fiber optic ferrule. The CWDM fiber optic ferrule has optical fibers that carry optical beams with at least two different wavelengths, which the non-CWDM ferrule has optical fibers that carry only one wavelength. The CWDM fiber optic ferrule causes the optical beam to make at least one 90 degree turn. The non-CWDM fiber optic ferrule has a lens pitch that matches the CWDM ferrule.

15 Claims, 4 Drawing Sheets

(51) Int. Cl.
  *G02B 6/40*    (2006.01)
  *G02B 6/42*    (2006.01)
  *G02B 27/09*   (2006.01)
  *G02B 6/34*    (2006.01)

(52) U.S. Cl.
  CPC ......... *G02B 6/3807* (2013.01); *G02B 6/3845* (2013.01); *G02B 6/3853* (2013.01); *G02B 6/3882* (2013.01); *G02B 6/4206* (2013.01); *G02B 6/4215* (2013.01); *G02B 27/0961* (2013.01); *G02B 6/34* (2013.01); *G02B 6/3839* (2013.01); *G02B 6/3861* (2013.01); *G02B 6/3885* (2013.01)

(58) Field of Classification Search
  CPC .. G02B 6/3839; G02B 6/3845; G02B 6/3853; G02B 6/3861; G02B 6/3882; G02B 6/3885; G02B 6/4206; G02B 6/4215
  See application file for complete search history.

(56) References Cited

U.S. PATENT DOCUMENTS

| | | |
|---|---|---|
| 9,285,544 B2 | 3/2016 | Panotopoulos et al. |
| 9,465,170 B1 * | 10/2016 | Childers ................ G02B 6/403 |
| 9,692,516 B2 | 6/2017 | Zhou et al. |
| 9,798,087 B1 | 10/2017 | Mathai et al. |
| 10,705,303 B2 | 7/2020 | Rosenberg et al. |
| 10,816,735 B2 | 10/2020 | Cuno et al. |
| 11,125,950 B2 | 9/2021 | Watanabe et al. |
| 2016/0282565 A1 | 9/2016 | Childers et al. |
| 2019/0052362 A1 | 2/2019 | Peterson et al. |
| 2020/0041727 A1 | 2/2020 | Yamamoto |
| 2020/0192035 A1 | 6/2020 | Leigh et al. |
| 2020/0363595 A1 | 11/2020 | Grann et al. |

* cited by examiner

SYSTEM AND METHOD FOR OPTICAL COMMUNICATIONS USING CWDM FERRULE MATED TO A NON-CWDM FERRULE

REFERENCE TO RELATED CASE

This application claims priority under 35 U.S.C. § 119 (e) to U.S. provisional application Nos. 62/892,413 and 62/892,416, both filed on Aug. 27, 2019, the contents of which are hereby incorporated by reference in their entirety.

BACKGROUND OF THE INVENTION

As the world becomes more dependent on on-line activities, mobile telephones, and virtual meetings and schools, the amount of data that is being transmitted and received is ever-increasing. However, the infrastructure that is currently in place is becoming more and more crowded with more and more optical fibers that carry that data and the connections that need to be made using those optical fibers. In one instance, there is a need for moving from data speeds of 10-40 Gbps to 100 Gbps (and beyond) in hyperscale datacenters. Various standards such as QSFP and OSFP are being proposed or have been implemented in support of such higher speed requirements with more optical fibers and fiber optic connectors per unit area. In addition, wavelength division multiplexing (WDM) techniques, combined with optimal encoding formats (NRZ, PAM4, etc.) are being exploited to yield yet higher speeds of data transfer. An example ferrule for handling optical signals at different wavelengths for four fibers is described in U.S. Pat. No. 9,692,516 ("the '516 patent").

For hyperscale data centers, a "leaf-spine" type architecture exists and is known in the art. In this architecture, servers handling high data speeds (terabits/second) form a "spine" of the data center. Additional servers that branch out from these spine servers form individual "leaves" of the "leaf-spine" architecture. The leaf servers handle lower data speeds. A high speed data link from one spine server to a group of leaf servers at lower speeds is typically serviced by MPO-style multi-fiber connectors. These MPO-style multi-fiber connectors then connect to an aggregate switch that is placed between "top-of-rack" switches ("ToR" switches) and the leaf server. The aggregate switch typically connects to the ToR switch via duplex LC connectors that have breakout fiber optic cables. The ToR switches further connect to and service individual racks of the servers. The ToR switch connects to the individual servers via copper cables, which presents a bottleneck in terms of speeds supported, costs, and space occupied.

There is a clear trend in the datacenter technology to advance speeds to 100 Gbps, and to 400 Gbps and beyond in the near future. The current setup in data centers was designed for 10-40 Gbps bandwidth, and the equipment needs a change in the type of fiber optic connectors as well as the way those fiber optic connectors are interconnected to handle higher data speeds. This requires a higher density of fiber optic connectors to be deployed within the same given space, as well as fiber optic ferrules that can handle CWDM optical signals and be mateable with other types of lensed fiber optic ferrules that handle coarse wavelength division multiplexing (CWDM) signals need to be split into individual optical beams for individual receiver channels, and combined into a composite CWDM in the other direction for transmission by a light source. The CWDM ferrules known in the art (e.g., in the '516 patent) only mate to a receptacle above a transceiver on a circuit board and are not utilized elsewhere in the optical link. Further, there are no techniques known in the current state of the art for intermateability of the CWDM ferrules to other types of non-CWDM ferrules. The pitch mismatch between the outputs of CWDM and non-CWDM ferrules is one of the challenges to address in mating of such ferrules.

Thus, an assembly of two fiber optic ferrules is presented to allow for the mating of CWDM and non-CWDM fiber optic ferrules. The non-CWDM fiber optic ferrule has optical fibers that carry different optical beams at different wavelengths. This configuration allows for the mating of the two different sides and allows for faster and higher throughputs of data.

SUMMARY OF THE INVENTION

The present invention is directed to an assembly of two fiber optic ferrules that includes a first fiber optic ferrule having at least one optical fiber for carrying at least two optical beams with different wavelengths and a second fiber optic ferrule having a first optical fiber to carry one of the optical beams and a second optical fiber to carry the second optical beam, the second fiber optic ferrule having a front face to engage at least a portion of the first fiber optic ferrule and a plurality of external lenses, the external lenses being disposed behind the front face.

In some embodiments, the first fiber optic ferrule is a CWDM ferrule and includes a filter block attached thereto.

In some embodiments, the first fiber optic ferrule turns the at least two optical beams 90 degrees within the first fiber optic ferrule.

In other embodiments, the second fiber optic ferrule includes a projection adjacent to the front face, the projection having at least two alignment structures to align the first fiber optic ferrule to the second fiber optic ferrule.

In yet another aspect, there is a fiber optic ferrule that includes a main body extending between a front face and a rear end and having a top, a bottom, and two sides, a plurality of external lenses, the plurality of external lenses disposed in a recessed portion between the front face and the rear end, a plurality of fiber supporting structures, each of the plurality of fiber supporting structures in alignment with a respective one of the plurality of external lenses, an opening in the rear end to receive at least two optical fibers, the optical fibers supported by one of the plurality of fiber supporting structures, and a projection extending away from the main body and having at least two alignment structures, the projection having a surface that is parallel to the front face.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
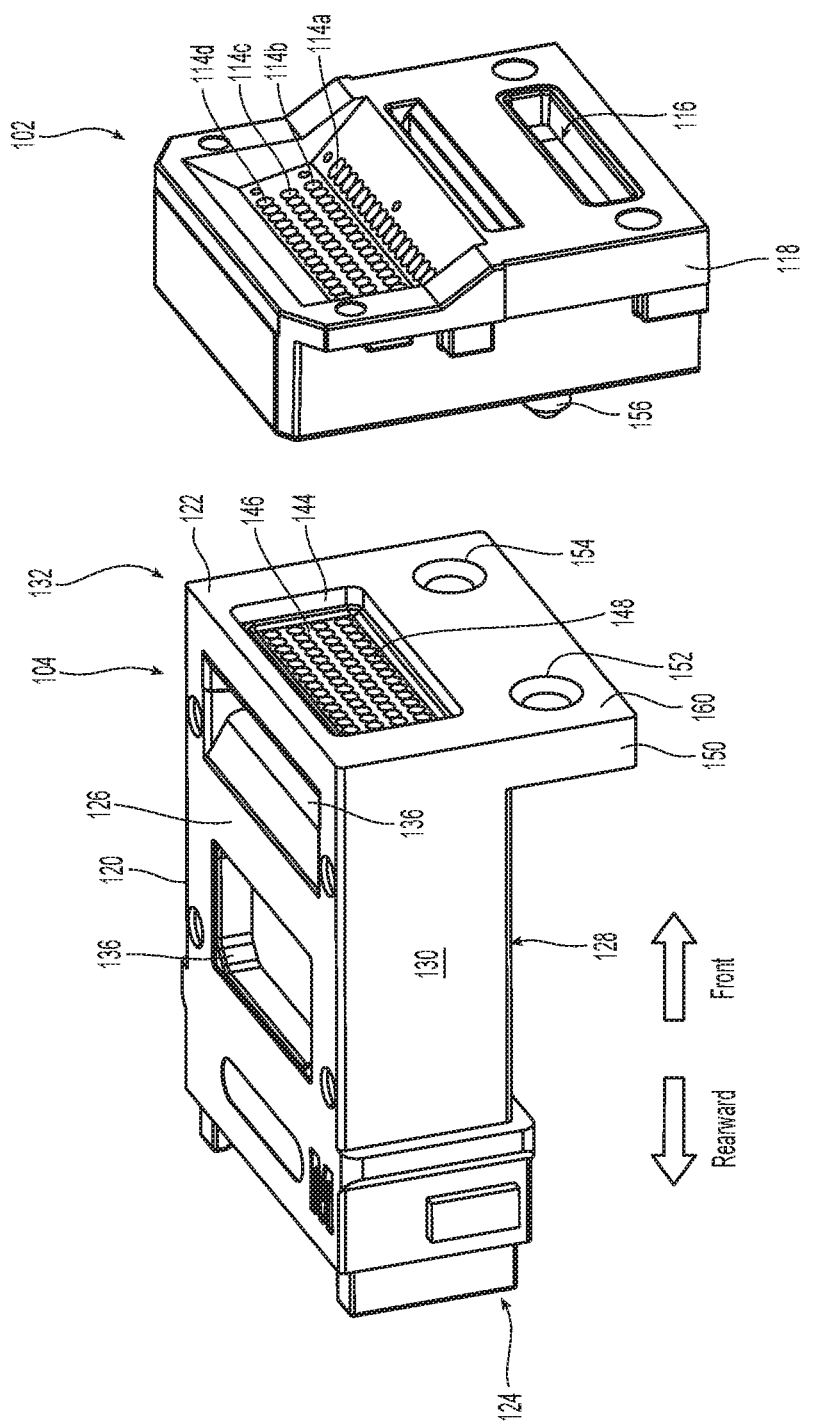
FIG. 1 is a perspective view of one embodiment of an assembly in an unmated condition according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Applicant notes that the term "front" or "forward" means that direction where the fiber optic connector would meet with another fiber optic connector or device, while the term "rear" or "rearward" is used to mean the direction from which the optical fibers enter into the fiber-optic ferrule or fiber optic connector. Each of the fiber optic ferrules will therefore have a front and rear, and the two fronts or forward portions of the fiber optic ferrules would engage one another. Thus, in FIG. 1, the "front" of the fiber optic ferrule on the left side of the figures is that part of the fiber optic connector on the right side of FIG. 1 and "forward" is to the right. For that fiber optic ferrule "rear" or "back" is that part of the fiber optic connector that is on the left side of the page and "rearward" and "backward" is toward the left. The front of the fiber optic ferrule on the right side of the FIG. 1 is facing the front of the fiber optic ferrule on the left.

Figure 2:
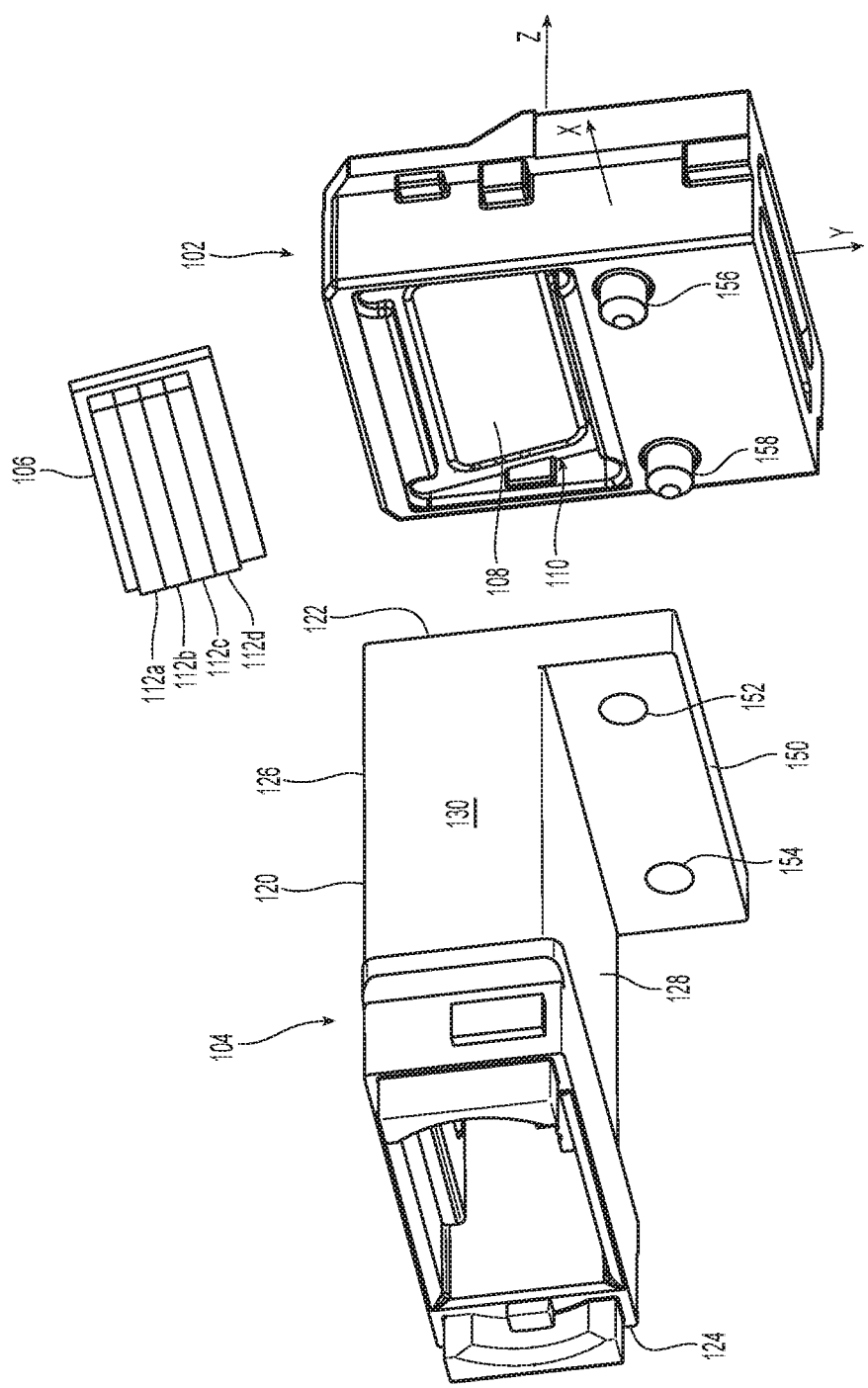
FIG. 2 is a perspective view of the assembly in FIG. 1 from a rear end of the second fiber optic ferrule.
Figure 3:
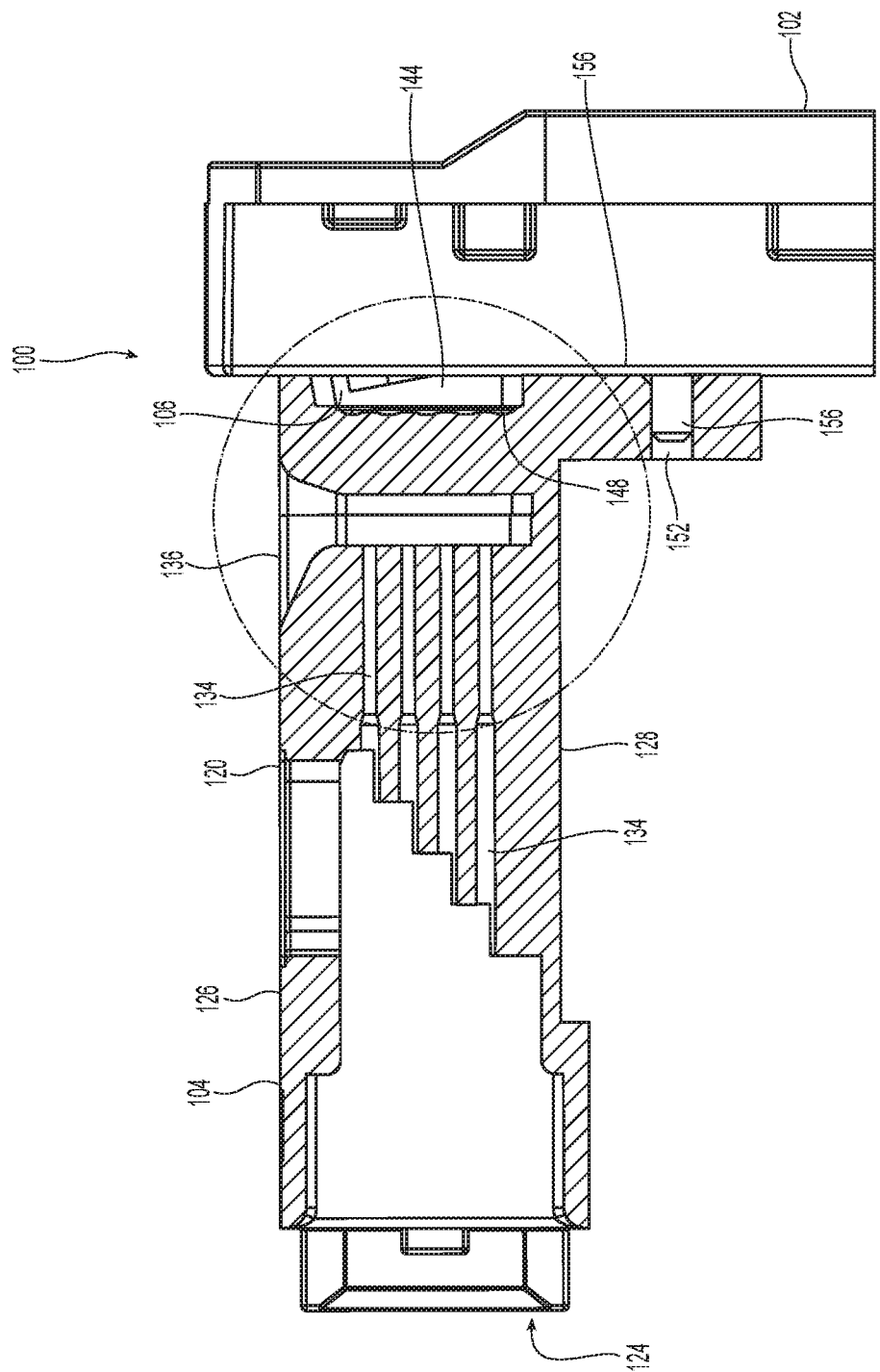
FIG. 3 is an elevation view of a cross section of the assembly in FIG. 1 in an assembled state.

Illustrated in FIGS. 1-3 is an assembly 100 of two fiber optic ferrules, a first fiber optic ferrule 102 and a second fiber optic ferrule 104, in an unmated condition. First fiber optic ferrule 102 is a CWDM fiber optic ferrule includes at least one optical fiber (not shown) that has at least two different wavelengths propagating therein. Such wavelengths may be generated by a light source (e.g., a laser) prior to entry into the first fiber optic ferrule 102 via the optical fibers. There may be more or fewer optical fibers in the fiber optic ferrules. Preferably there is only one row of optical fibers in the first fiber optic ferrule 102. In one example, the CWDM ferrule includes sixteen (16) fibers in a single row, each handling four different wavelengths ($\lambda_1$-$\lambda_4$) in a given band in the optical spectrum. For example, the possibilities include $\lambda_1$=990 nm, $\lambda_2$=1015 nm, $\lambda_3$=1040 nm, and $\lambda_4$=1065 nm, i.e., a difference ($\Delta\lambda$) between any two wavelengths is typically 25 nm. Typically, such CWDM ferrules are utilized for on-board optics in which the output beams at $\lambda_1$-$\lambda_1$ are received by a photodetector of an on-board transceiver. In the other direction (for transmission), these four optical beams are typically transmitted by an on-board light source (e.g., a VCSEL) and may enter individual optical fiber fibers of an optical fiber ribbon on the CWDM ferrule as a multiplexed optical beam or a composite beam. The output beams at $\lambda_1$-$\lambda_4$ wavelengths for the CWDM ferrule are at a pitch of 0.375 mm. That is, each wavelength at the output of the CWDM ferrule is spatially separated from the other by 0.375 mm. See FIGS. 3 and 4

The first fiber optic ferrule 102 (CWDM) includes a filter block 106 attached to an angled end face 108 thereof. As best seen in FIG. 3, there is a recessed portion 110 of the first fiber optic ferrule 102 (CWDM) that includes the angled end face 108 The filter block 106 is a wavelength specific filter that includes four filters 112(a-d)—one for each wavelength. The wavelengths rejected by one of the filters are reflected back into the first fiber optic ferrule 102 (CWDM) and encounter internal reflectors in rows 114(a-d) disposed adjacent a top surface of the first fiber optic ferrule 102 (CWDM). There are 16 reflectors in each of the rows, which correspond with the number of optical fibers in the first fiber optic ferrule 102. The remaining reflected wavelengths undergo subsequent filtering and reflections to finally exit the filter block 106 as constituent wavelengths $\lambda_1$, $\lambda_2$, $\lambda_3$, and $\lambda_4$. By principle of reversibility, the wavelengths follow the same path during transmission and enter the first fiber optic ferrule 102 (CWDM) via the filter block 106 to finally exit individual fibers in the fiber ribbon as composite CWDM beams.

The filter block 106 may protrude from the recessed portion 110 in the first fiber optic ferrule 102. However, as will be noted below, the filter block 106 will not directly engage the second fiber optic ferrule 104.

Figure 4:
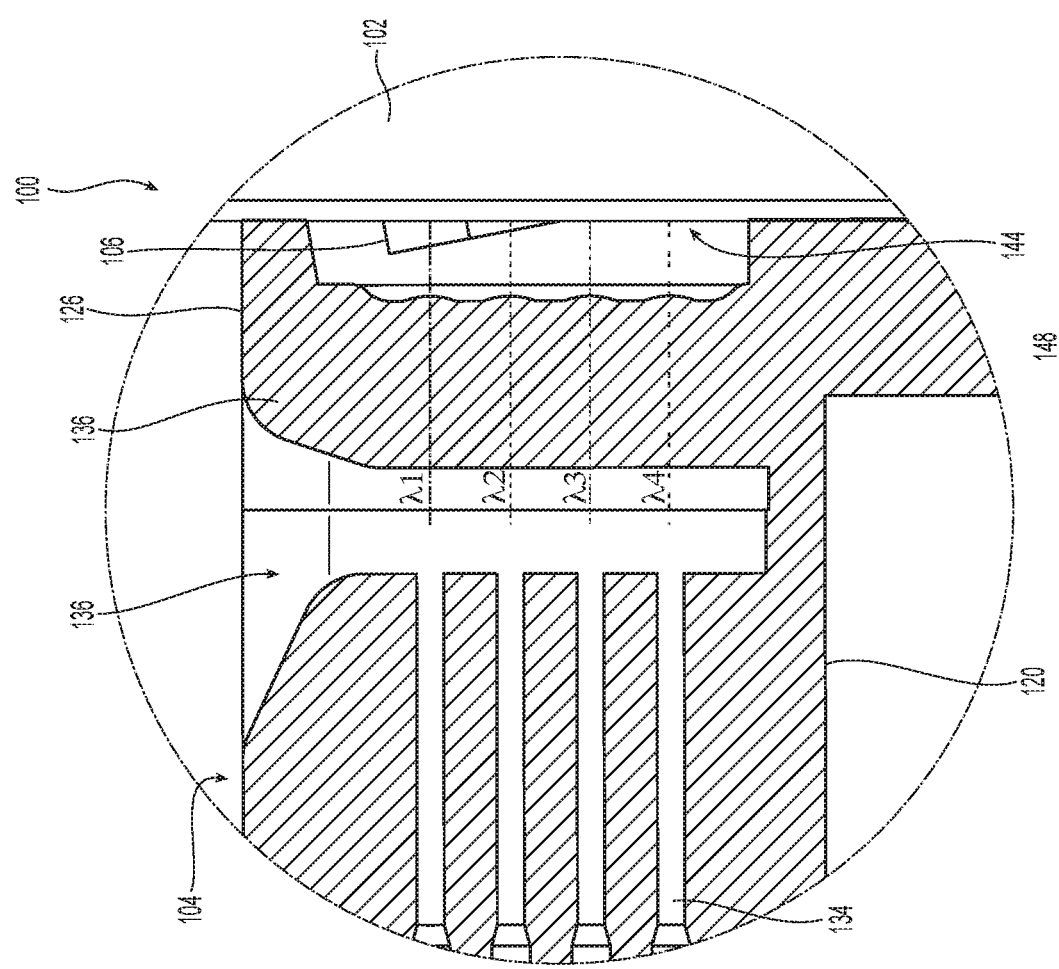
FIG. 4 is a partial, enlarged view of the assembly with representations of the optical beam paths.

The first fiber optic ferrule 102 (CWDM) has an opening 116 in a back end 118 to receive optical fibers therein. The optical beams pass through the optical fibers and are reflected first (when transmitting) by the internal reflector 114a through 90 degrees to the filter block 106 and then the second fiber optic ferrule 104. As illustrated in FIG. 4, only the wavelength of $\lambda_1$ makes it through the filter block 106 to the second fiber optic ferrule 104. The light not making it through is reflected to the internal reflector 114b and then to the filter block 106. This continues with the other wavelengths. The four optical beams are received by the optical fibers in the second fiber optic ferrule 104 in the assembly 102. When the first fiber optic ferrule 102 is the recipient of the optical beams from the second fiber optic ferrule 104, the process is reversed.

Turning to the second fiber optic ferrule 104, it is a non-CWDM fiber optic ferrule. It could be, for example, based on the PRIZM® MT ferrule provided by the Applicant. However modifications have been made to arrive at the second fiber optic ferrule 104 to allow for the mating with the first fiber optic ferrule 102. The second fiber optic ferrule 104 has a main body 120 extending between a front face 122 and a rear end 124. The main body 120 also has a top 126, a bottom 128, and two sides 130, 132. Optical fibers are inserted through the rear end 124 and are secured within optical fiber supporting structures 134. The optical fiber supporting structures 134 may include micro holes, v-grooves, u-grooves, or have a different configuration. In the second fiber optic ferrule 104 as illustrated in FIGS. 1-3, there are four rows (representing the number of fiber ribbons, for example) and 16 columns (representing the number of optical fibers in each ribbon, for example). Main body 120 may also have epoxy windows 136 that open through the top 126.

At the front end 140 of the second fiber optic ferrule 104 is a front face 122 to engage at least a portion of the first fiber optic ferrule 102. The front end 140 of the second fiber optic ferrule 104 also has a recessed portion 144. Within the recessed portion 144 and on a forward facing surface 146 are a plurality of external lenses 148. Each of the plurality of external lenses 148 are optically aligned with a respective one of the optical fiber supporting structures 134. The recessed portion 144 could be deeper or shallower than that illustrated in the figures. However, the filter block 106, which extends beyond a bottom surface of the second fiber optic ferrule 102 should not engage forward facing surface 146 where the plurality of external lenses 148 are located.

Also at the front end 140 of the second fiber optic ferrule 104 is a projection 150 that extends beyond the bottom 128 of the main body 120. The projection 150 is preferably co-planar with the top 126 and the two sides 130, 132. The projection 150 also includes two alignment structures 152, 154, which are holes as illustrated in FIGS. 1-4. However, the alignment structures 152, 154 could have a different configuration, depth, location, etc. The alignment structures 152, 154 receive the alignment projections 156, 158 on the first fiber optic ferrule 104. When the alignment projections 156, 158 are received within the alignment structures 152, 154, the two components of the assembly 100 are optically aligned with one another.

The projection 150 has a front surface 160 that is preferably coplanar with the front face 142. However, the front surface 160 of the projection 150 could lie in a plane that is different from the front face 142.

Returning to FIG. 4, the pitch between the rows of optical fibers in the second fiber optic ferrule 104 is 0.375 mm, which matches the pitch of the separate output beams at $\lambda_1$-$\lambda_4$ wavelengths from the first fiber optic ferrule 102. The pitch of the columns of optical fibers in the second fiber optic ferrule 104 is 0.250 mm, which is the standard pitch for non-CWDM fiber optic ferrules.

In one aspect, the projection 150 may be optional, such that the alignment structures 152, 154 may be within the front face, near the recessed portion 144. In that case, the alignment projections 156, 158 are appropriately positioned on the first ferrule 102.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. An assembly of two fiber optic ferrules comprising:
   a first fiber optic ferrule having at least one optical fiber for carrying at least two optical beams with different wavelengths, wherein the first fiber optic ferrule is a CWDM ferrule; and
   a second fiber optic ferrule having a first optical fiber to carry one of the optical beams and a second optical fiber to carry the second optical beam, the second fiber optic ferrule having a front face to engage at least a portion of the first fiber optic ferrule and a plurality of external lenses and has a main body,
   wherein the second fiber optic ferrule is a non-CWDM ferrule and has a projection extending away from the main body and in a direction parallel to the front face of the second fiber optic ferrule and in contact with the first fiber optic ferrule in the assembly.

2. The assembly according to claim 1, wherein the first fiber optic ferrule includes a filter block attached thereto.

3. The assembly according to claim 1, wherein the first fiber optic ferrule turns the at least two optical beams 90 degrees within the first fiber optic ferrule.

4. The assembly according to claim 1, wherein the projection includes at least two alignment structures to align the first fiber optic ferrule to the second fiber optic ferrule.

5. The assembly according to claim 4, wherein the alignment structures are holes to receive projections from the first fiber optic ferrule.

6. The assembly according to claim 1, wherein each of the plurality of external lenses are spaced at a pitch of 0.375 mm.

7. The assembly according to claim 1, wherein each of the plurality of external lenses is associated with an optical fiber supporting structure within the second fiber optic ferrule.

8. The assembly according to claim 1, wherein the external lenses are disposed behind the front face.

9. A fiber optic ferrule having a front face to directly contact a CWDM fiber optic ferrule comprising:
   a main body extending between the front face and a rear end and having a top, a bottom, and two sides;
   a plurality of external lenses, the plurality of external lenses disposed in a recessed portion between the front face and the rear end;
   a plurality of fiber supporting structures, each of the plurality of fiber supporting structures in alignment with a respective one of the plurality of external lenses;
   an opening in the rear end to receive at least two optical fibers, the optical fibers supported by one of the plurality of fiber supporting structures; and
   a projection extending away from the main body and in a direction parallel to the front face and having at least two alignment structures, the projection having a surface that is parallel to the front face.

10. The fiber optic ferrule according to claim 9, wherein the optical fibers and external lenses are arranged in rows and columns, the optical fibers in each column transporting optical beams with different wavelengths.

11. The fiber optic ferrule according to claim 9, wherein the at least two alignment structures are holes.

12. The fiber optic ferrule according to claim 9, wherein each row of the plurality of external lenses are spaced at a pitch of 0.375 mm.

13. The fiber optic ferrule according to claim 9, wherein the recessed portion can receive at least a portion of a filter block without touching any of the plurality of external lenses.

14. The fiber optic ferrule according to claim 9, wherein optical fibers entering the main body are perpendicular to optical fibers entering the CWDM ferrule when the two fiber optic ferrules are mated to one another.

15. The fiber optic ferrule according to claim 9, wherein the surface on the projection is coplanar with the front face.

* * * * *

UNITED STATES PATENT AND TRADEMARK OFFICE
CERTIFICATE OF CORRECTION

| | |
|---|---|
| PATENT NO. | : 11,874,506 B2 |
| APPLICATION NO. | : 17/635253 |
| DATED | : January 16, 2024 |
| INVENTOR(S) | : Mitchell Cloud, DJ Hastings and Darrell R. Childers |

Page 1 of 1

It is certified that error appears in the above-identified patent and that said Letters Patent is hereby corrected as shown below:

On the Title Page

Item [73], delete "US Conec Lid.," should be --US Conec Ltd.,--

Signed and Sealed this
Fifth Day of March, 2024

Katherine Kelly Vidal
*Director of the United States Patent and Trademark Office*